US012713219B2

(12) United States Patent
Zhu et al.

(10) Patent No.: US 12,713,219 B2
(45) Date of Patent: Aug. 18, 2026

(54) METHOD AND APPARATUS FOR SUBSRIPTION MANAGEMENT

(71) Applicant: Telefonaktiebolaget LM Ericsson (publ), Stockholm (SE)

(72) Inventors: Jinyin Zhu, Shanghai (CN); Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 698 days.

(21) Appl. No.: 17/920,820

(22) PCT Filed: Apr. 24, 2020

(86) PCT No.: PCT/CN2020/086752
§ 371 (c)(1),
(2) Date: Oct. 24, 2022

(87) PCT Pub. No.: WO2021/212484
PCT Pub. Date: Oct. 28, 2021

(65) Prior Publication Data

US 2023/0164538 A1 May 25, 2023

(51) Int. Cl.
*H04W 8/18* (2009.01)
*H04W 4/12* (2009.01)

(52) U.S. Cl.
CPC ............... *H04W 8/18* (2013.01); *H04W 4/12* (2013.01)

(58) Field of Classification Search
CPC ............ H04W 8/18; H04W 4/12; H04L 51/58
See application file for complete search history.

(56) References Cited

U.S. PATENT DOCUMENTS

| | | | | |
|---|---|---|---|---|
| 8,311,521 | B1 * | 11/2012 | Paczkowski ............ | H04W 8/18 455/412.2 |
| 12,262,294 | B2 * | 3/2025 | Fernandez Alonso .. | H04W 4/24 |
| 2005/0154795 | A1 * | 7/2005 | Kuz ........................ | H04L 63/10 709/227 |
| 2007/0225047 | A1 * | 9/2007 | Bakos ............... | H04M 1/72445 455/566 |

(Continued)

FOREIGN PATENT DOCUMENTS

| | | |
|---|---|---|
| CN | 101127613 A | 2/2008 |
| EP | 2280566 A1 | 2/2011 |

(Continued)

OTHER PUBLICATIONS

Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.

(Continued)

*Primary Examiner* — Congvan Tran

(74) *Attorney, Agent, or Firm* — Withrow & Terranova, PLLC

(57) ABSTRACT

Embodiments of the present disclosure provide methods and apparatuses for subscription management. A method at a data management entity comprises determining whether a (Continued)

300 determining whether a phone number is unsubscribed to a user; — 302 sending a first message to a network exposure entity, wherein the first message includes an indication which indicates whether the phone number is unsubscribed to the user. — 304 phone number is unsubscribed to a user. The method further comprises sending a first message to a network exposure entity, wherein the first message includes an indication which indicates whether the phone number is unsubscribed to the user.

18 Claims, 6 Drawing Sheets

(56) References Cited

U.S. PATENT DOCUMENTS

2010/0178904 A1* 7/2010 Low .................. G06Q 30/02 455/415
2013/0165167 A1* 6/2013 Sweeney .............. H04W 12/08 455/466
2015/0006572 A1* 1/2015 Anpat ................ H04L 65/1016 707/770
2019/0349741 A1 11/2019 Bellam et al.
2020/0296575 A1* 9/2020 Lu .................... H04W 8/245
2020/0366567 A1* 11/2020 Li .................... H04L 41/5019
2022/0007145 A1* 1/2022 El Essaili ............ H04W 4/029
2022/0232460 A1* 7/2022 Fu .................... H04W 12/10
2023/0135630 A1* 5/2023 Chai .................. H04M 15/66 455/406
2024/0388945 A1* 11/2024 Karapantelakis ..... H04W 24/10

FOREIGN PATENT DOCUMENTS

WO 2014063744 A1 5/2014
WO 2019192326 A1 10/2019

OTHER PUBLICATIONS

Author Unknown, "Technical Specification Group Services and System Aspects; Architecture enhancements to facilitate communications with packet data networks and applications (Release 16)," Technical Specification 23.682, Version 16.6.0, Mar. 2020, 3GPP Organizational Partners, 134 pages.
Author Unknown, "Technical Specification Group Core Network and Terminals; 5G System; Network Exposure Function Northbound APIs; Stage 3 (Release 16)," Technical Specification 29.522, Version 16.3.0, Mar. 2020, 3GPP Organizational Partners, 150 pages.
International Search Report and Written Opinion for International Patent Application No. PCT/CN2020/086752, mailed Jan. 26, 2021, 9 pages.

* cited by examiner

METHOD AND APPARATUS FOR SUBSRIPTION MANAGEMENT

TECHNICAL FIELD

This application is a 35 U.S.C. § 371 national phase filing of International Application No. PCT/CN2020/086752, filed Apr. 24, 2020, the disclosure of which is incorporated herein by reference in its entirety.

The non-limiting and exemplary embodiments of the present disclosure generally relate to the technical field of communications, and specifically to methods and apparatuses for subscription management.

BACKGROUND

This section introduces aspects that may facilitate a better understanding of the disclosure. Accordingly, the statements of this section are to be read in this light and are not to be understood as admissions about what is in the prior art or what is not in the prior art.

3GPP Release 13 introduced a new node in the EPC (Evolved Packet Core) in 4G for exposure of 3GPP network service capabilities to 3rd party applications. This node is the Service Capability Exposure Function (SCEF).

In 5G, the corresponding entity is Network Exposure Function (NEF), this function also provides a means to securely expose the services and capabilities provided by 3GPP network functions to 3rd party applications.

Both SCEF and NEF support a few events monitoring and reporting, which is defined in standard 3GPP TS 23.682 V16.6.0 and 3GPP TS 29.522 V16.3.0, the disclosure of which is incorporated by reference herein in its entirety. SCEF/NEF is comprised of means that allow the identification of the 3GPP network element suitable for configuring the specific events, the event detection, and the event reporting to the authorized users, e.g. for use by applications or logging, etc. If such an event is detected, the network might be configured to perform special actions, e.g. limit the UE access.

The international mobile subscriber identity (IMSI) is a number that uniquely identifies a mobile subscriber of a 4G network, it is this number is provisioned in the a USIM (Universal Subscriber Identity Module) card. In 5G the corresponding number is called SUPI (Subscription Permanent Identifier).

International Mobile Equipment Identities (IMEI) is a number that uniquely identifies a terminal device (UE, e.g.: mobile phone) in 4G network. the IMEI only identifies the terminal device and has no particular relationship to the subscriber. In 5G the corresponding number is called PEI (Permanent Equipment Identifier).

3GPP TS 23.682 V16.6.0 has defined one type of monitoring events in 4G: Monitoring the Change of IMSI-IMEI Association. Change of IMSI-IMEI indicates a change of the IMEI that uses a specific subscription IMSI. It is based on the HSS (Home Subscriber Server) being informed by the MME (Mobility Management Entity) about the UE's IMEI. 3GPP TS 29.522 V16.3.0 has defined corresponding type of monitoring events in 5G: Change of SUPI-PEI Association monitoring event.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

People usually use the MSISDN (Mobile Station International Subscriber Directory Number) which is usually seen as mobile phone number as the key information to register to 3rd party service provider, e.g., bank, broke, TenCent, Alipay, ridesharing company, etc. For example, many users use their phone number MSISDN as login name to log on their account. Therefore the 3rd party service provider will associate the phone number with the specific user.

However, when a person using an MSISDN is unsubscribed from the mobile operator, the 3rd party service providers are not aware of this and may keep the person's information as valid, unless the person explicitly unsubscribes from the service providers. What is worse is that when the MSISDN is reused by another person later, some service providers may associate the out of date information to the new person which causes many troubles for the both the individual person and the 3rd service provider.

The existing monitoring event Change of IMSI-IMEI Association (or SUPI-PEI Association) only indicates that the USIM card is associated to a new equipment or a new software release which does not reflect the subscription status of MSISDN and hence cannot be used for this purpose.

To overcome or mitigate at least one above mentioned problems or other problems or provide a useful solution, the embodiments of the present disclosure propose an improved event report subscription management solution.

In a first aspect of the disclosure, there is provided a method at a data management entity. The method comprises determining whether a phone number is unsubscribed to a user. The method further comprises sending a first message to a network exposure entity, wherein the first message includes an indication which indicates whether the phone number is unsubscribed to the user.

In a second aspect of the disclosure, there is provided a method at an application server. The method comprises ending a second request for information of whether a phone number is unsubscribed to a user to a network exposure entity. The method further comprises receiving a second response from the network exposure entity, wherein the second response includes the information of whether the phone number is unsubscribed to the user to a network exposure entity.

In a third aspect of the disclosure, there is provided an apparatus at a data management entity. The apparatus comprises at least one processor and at least one memory, the at least one memory containing instructions executable by the at least one processor, whereby the data management entity is operative to determine whether a phone number is unsubscribed to a user. Said apparatus is further operative to send a first message to a network exposure entity, wherein the first message includes an indication which indicates whether the phone number is unsubscribed to the user.

In a fourth aspect of the disclosure, there is provided an apparatus at an application server. The apparatus comprises at least one processor and at least one memory, the at least one memory containing instructions executable by the at least one processor, whereby the data management entity is operative to send a second request for information of whether a phone number is unsubscribed to a user to a network exposure entity. Said apparatus is further operative to receive a second response from the network exposure entity, wherein the second response includes the information of whether the phone number is unsubscribed to the user to a network exposure entity.

In fifth aspect of the disclosure, there is provided a data management entity. The data management entity comprises a determining module and a sending module. The determining module may be configured to determine whether a phone number is unsubscribed to a user. The sending module may be configured to send a first message to a network exposure entity, wherein the first message includes an indication which indicates whether the phone number is unsubscribed to the user.

In sixth aspect of the disclosure, there is provided an application server. The application server comprises a sending module and a receiving module. The sending module may be configured to send a second request for information of whether a phone number is unsubscribed to a user to a network exposure entity. The receiving module may be configured to receive a second response from the network exposure entity, wherein the second response includes the information of whether the phone number is unsubscribed to the user to a network exposure entity.

In seventh aspect of the disclosure, there is provided a data management system comprising a plurality of network nodes. The data management system is configured to determine whether a phone number is unsubscribed to a user. The data management system is further configured to send a first message to a network exposure entity, wherein the first message includes an indication which indicates whether the phone number is unsubscribed to the user.

In seventh aspect of the disclosure, there is provided an application server system comprising a plurality of network nodes. The application server system is configured to send a second request for information of whether a phone number is unsubscribed to a user to a network exposure entity. The application server system is further configured to receive a second response from the network exposure entity, wherein the second response includes the information of whether the phone number is unsubscribed to the user to a network exposure entity.

In another aspect of the disclosure, there is provided a computer-readable storage medium storing instructions which when executed by at least one processor, cause the at least one processor to perform the method according to the first aspect of the disclosure.

In another aspect of the disclosure, there is provided a computer program product, comprising instructions which, when executed on at least one processor, cause the at least one processor to carry out the method according to the first aspect of the disclosure.

In another aspect of the disclosure, there is provided a computer-readable storage medium storing instructions which when executed by at least one processor, cause the at least one processor to perform the method according to the second aspect of the disclosure.

In another aspect of the disclosure, there is provided a computer program product, comprising instructions which, when executed on at least one processor, cause the at least one processor to carry out the method according to the second aspect of the disclosure.

Many advantages may be achieved by applying the proposed solution according to embodiments of the present disclosure. For example, the proposed solution according to some embodiments of the present disclosure introduce a mechanism enabling the 3rd party service providers to be aware of the un-subscription of an MSISDN (phone number) to an individual person (e.g., identified by ID card). 3rd party service providers can take appropriate actions based on this, e.g., remove the information related to the MSISDN and remind this to the end user by other means (e.g., email), which will also avoid the troubles brought to the new person being allocated with the same MSISDN sometime later.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
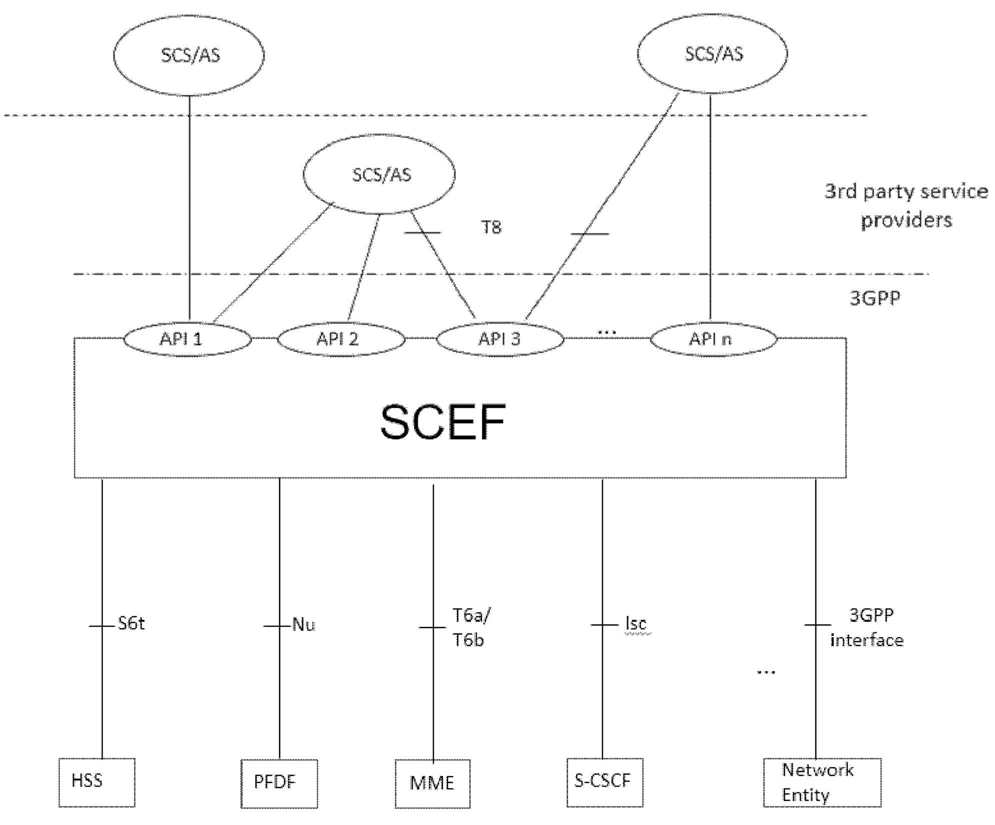
FIG. 1 schematically shows 3GPP Architecture for Service Capability Exposure in EPC.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR). In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the 5G communication protocols, and/or any other protocols either currently known or to be developed in the future.

The term "entity" used herein refers to a network device or network node or network function in a communication network, the entity may be implemented in a physical node or in distributed system (e.g.: in cloud). For example, in a wireless communication network such as a 3GPP-type cellular network, a core network device may offer numerous services to customers who are interconnected by an access network device. Each access network device is connectable to the core network device over a wired or wireless connection.

The term "network function (NF)" refers to any suitable function which can be implemented in a network node (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), (R)AN ((radio) access network), SCP (service communication proxy), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

FIG. 1 shows the Architecture for Service Capability Exposure in EPC. The SCEF exposes 3GPP services and capabilities to the SCS/AS via a set of APIs and hides the underlying 3GPP network topology from the SCS/AS. Thus, the SCS/AS is securely isolated from the internal 3GPP network nodes. Although the SCEF is part of the network operator's trust domain, the SCS/AS(s) that it interfaces to may or may not be part of the network operator's trust domain. For example, an SCS/AS may be a device management platform that is deployed and controlled by the network operator or it may be a services platform that is deployed by a third party that has a business relationship with the network operator.

The interfaces that connect the SCEF to SCS/AS(s) are termed Northbound interfaces. The Northbound API interface was given the name T8. The interfaces that connect the SCEF to internal core network nodes are termed Southbound interfaces, which includes S6t, Nu, T6a/T6b, ISC, etc. S6t is the interface between SCEF and HSS, Nu is the interface between SCEF and PFDF (Packet Flow Description Function), T6a/T6b is the interface between SCEF and MME, Isc is the interface between SCEF and S-CSCF (Serving—Call Session Control Function), and there are also other 3GPP interfaces between SCEF and other network entity.

Figure 2:
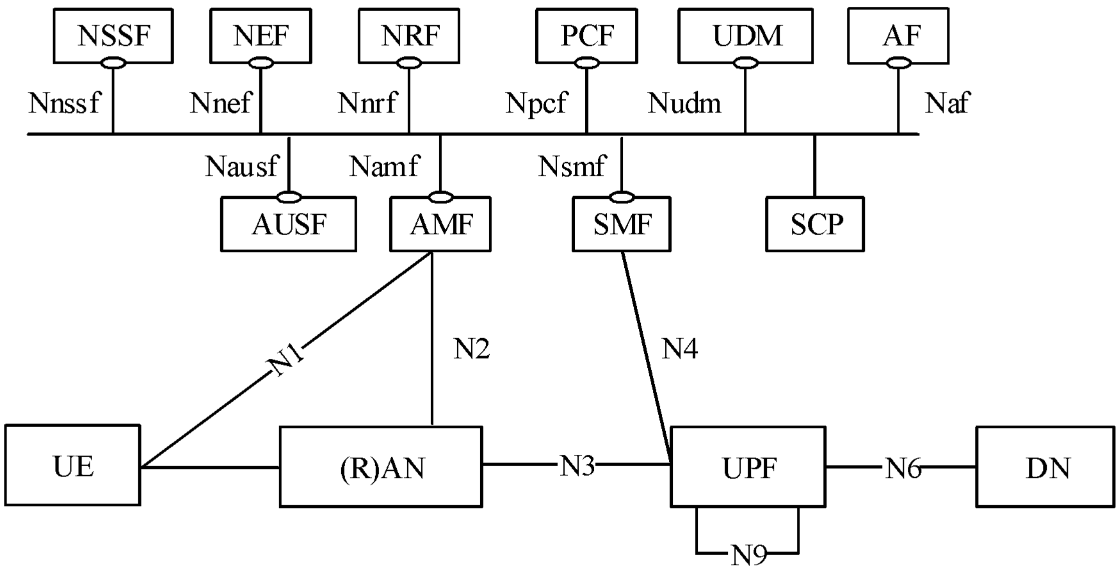
FIG. 2 schematically shows 3GPP 5G Core Architecture.

FIG. 2 schematically shows a high level architecture in the next generation network such as 5G. The system architecture of FIG. 1 may comprise some exemplary elements such as AUSF, AMF, DN (data network), NEF, NRF, NSSF, PCF, SMF, UDM, UPF, AF, UE, (R)AN, SCP, etc.

In accordance with an exemplary embodiment, the UE can establish a signaling connection with the AMF over the reference point N1, as illustrated in FIG. 1. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.0.2, the disclosure of which is incorporated by reference herein in its entirety.

Figure 3:
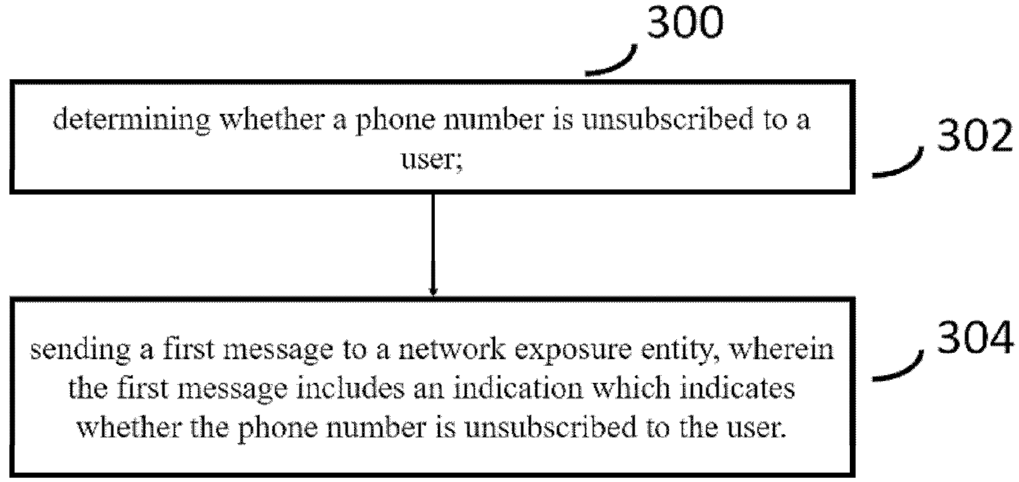
FIG. 3 shows a flowchart of a method according to one embodiment of the present disclosure.

FIG. 3 shows a flowchart of a method according to an embodiment of the present disclosure, which may be performed by an apparatus implemented in or at or communicatively coupled to a data management entity. As such, the apparatus may provide means or module for accomplishing various parts of the method 300 as well as means or module for accomplishing other processes in conjunction with other components.

As used herein, the data management entity may be HSS in EPC as FIG. 1 shown or UDM in 5G Core as FIG. 2 shown.

At block 302, the data management entity determines whether a phone number is unsubscribed to a user. The data management entity may determine whether a phone number is unsubscribed to a user in various ways. In one embodiment, HSS/UDM may obtain the information of whether the phone number is unsubscribed to the user from an Operation Supporting System, OSS, entity by sending a request. The phone number is identified by Mobile Subscriber ISDN Number, MSISDN, in 4G system or Generic Public Subscription Identifier, GPSI, in 5G system. In another embodiment, the OSS system may proactively send the information of whether the phone number is unsubscribed to the user to the HSS/UDM, in this scenario the HSS/UDM don't need to send any request to OSS system.

For example, when a user decides not to use a phone number anymore for some reason, the user may go to the business hall of the operator with the user's ID card. The staff in the business hall may make an withdraw command in the operator's system (for example in OSS) to make the phone number not associate with the user who is identified by the user's ID card information, and then the OSS node sends the un-subscription information with reason "normal un-subscription" to the HSS/UDM.

For another example, the user may want to use the phone number, but the user wants to change the operator with the same phone number. The user may go to the business hall of the operator with the user's ID card. The staff in the business hall may make a Port Out service to change the operator from operator A to operator B in the operator's system (for example in OSS). Then the OSS node sends the un-subscription information with reason "ported out" to the HSS/UDM. The OSS may include additional Port Out information to the HSS/UDM, and the Port Out information may further comprise the ported in operator ID which is the identification of operator B. Whether the "ported in operator ID" can be included in the report will depend on the business SLA (Level Agreement) between the ported out and ported in operators.

The data management entity may obtain the information of whether the phone number is unsubscribed to the user from the OSS entity under different conditions.

In one embodiment, the data management may obtain the information based on the event subscription (here we call it Subscription Mode). In the Subscription Mode, a new monitoring event for MSISDN un-subscription notification is introduced. SCS/AS makes the event subscription in HSS/UDM, specifically, SCS/AS may send a request to HSS/UDM via SCEF/NEF with the Monitoring Type set to "MSISDN un-subscription". This event type indicates that when the MSISDN is not associated with the current person (e.g., the person unsubscribes the MSISDN from the operator). After receiving the request, the HSS/UDM monitors the event periodically by sending request to OSS node to obtain the information of whether the phone number is unsubscribed to the user. The request the HSS/UDM can be Monitoring Request in 4G scenario or Nudm_EventExposure_Subscribe Request message in 5G scenario.

In another embodiment, the data management may obtain the information based on the Query (here we call it Query Mode). Here a new status request/response mode is introduced to obtain the current subscription status of the MSISDN/GPSI (phone number). For example, the HSS/UDM may receive a request from SCEF/NEF for information of whether the phone number is unsubscribed to the user. The request HSS/UDM received can be Subscription Status Request message. Upon receiving the request, the HSS/UDM send request for once to OSS node to obtain the information of whether the phone number is unsubscribed to the user.

At block 304, the data management entity sends a first message to a network exposure entity, wherein the first message includes an indication which indicates whether the phone number is unsubscribed to the user. The network exposure entity may be a Service Capability Exposure Function, SCEF, in 4G scenario or a Network Exposure Function, NEF in 5G scenario.

When the OSS system proactively sends the information of whether the phone number is unsubscribed to the user to the HSS/UDM, the HSS/UDM knows that the status of the phone number, and HSS/UDM sends a first message to a SCEF/NEF, the first message includes an indication which indicates whether the phone number is unsubscribed to the user. When the data management is in Subscription Mode, HSS/UDM monitors the event periodically by sending a request to OSS node to obtain the information of whether the phone number is unsubscribed to the user. When HSS/UDM finds that the phone number is unsubscribed to the user, it sends an indication which indicates that the phone number is not associated with the user anymore to SCS/AS via SCEF/NEF, and optionally, HSS/UDM may send the un-subscription reason included in the same message to SCS/AS. For another example, when HSS/UDM finds that the phone number has been ported out, it sends an indication which indicates that the phone number has been ported out to another operator SCS/AS via SCEF/NEF, and optionally, HSS/UDM may send the ported in operator ID included in the same message to SCS/AS via SCEF/NEF. The indication can be included in the Monitoring Response message in 4G scenario or be included in the Nudm_EventExposure_Subscribe Response message in 5G scenario.

When the data management is in Query Mode. When HSS/UDM receives Subscription Status Request from SCEF/NEF, HSS/UDM sends a request to OSS node to obtain the information of whether the phone number is unsubscribed to the user. And then HSS/UDM sends the indication of current status of the phone number (whether the phone number is still associated with the user and/or whether the phone number has been ported out to another operator) to SCS/AS via SCEF/NEF. The indication can be included in the Subscription Status Response message.

The indication included in the first message can be in various format, for example, it can be one bit, 0 presents the phone number is still associated with the user; 1 represents the phone number is not associated with the user anymore. And optionally it may be 2 bit, 00 represents the phone number still belong to the user and the operator is unchanged; 01 represents the phone number is not associated with the user anymore, 10 represents the phone number still belong to the user but the operator is changed.

The present solution introduces a mechanism enabling the HSS/UDM to send the indication to 3rd party service providers, when HSS/UDM finds association between MSISDN (phone number) and an individual person (e.g., identified by ID card) is changed. 3rd party service providers can take appropriate actions based on this, e.g., remove the information related to the MSISDN/GPSI and remind this to the end user by other means (e.g., email), which will also avoid the troubles brought to the new person being allocated with the same MSISDN/GPSI sometime later.

Figure 4:
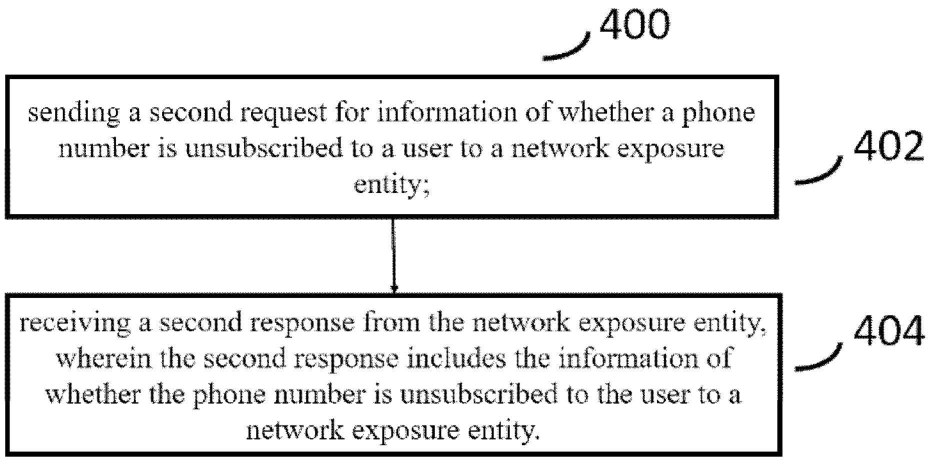
FIG. 4 shows a flowchart of a method according to another embodiment of the present disclosure.

FIG. 4 shows a flowchart of a method according to an embodiment of the present disclosure, which may be performed by an apparatus implemented in or at or communicatively coupled to an application server. As such, the apparatus may provide means or module for accomplishing various parts of the method 400 as well as means or module for accomplishing other processes in conjunction with other components.

As used herein, the application server may be SCS/AS in EPC as FIG. 1 shown or AF in 5G Core as FIG. 2 shown. The application server can be the server used by 3rd party service provider, such as the bank, broke or other application provider such as Wechat, Alipay, Facebook, Didi, Mobike, and so on. When users use these applications, they may register an account with their phone number, and these 3rd party service provider may send various messages to the phone number.

At Block 402, the application server sends a second request for information of whether a phone number is unsubscribed to a user to a network exposure entity. The network exposure entity may be a Service Capability Exposure Function, SCEF, in 4G scenario or a Network Exposure Function, NEF in 5G scenario.

The second request can be an event subscription request or a status query request.

When the second request is an event subscription request, a new event for MSISDN un-subscription notification is introduced. SCS/AS makes the event subscription in HSS/UDM, specifically, SCS/AS may send a Monitoring Request to SCEF/NEF with the Monitoring Type set to "MSISDN un-subscription". This event type indicates that when the MSISDN is not associated with the current person (e.g., the person unsubscribes the MSISDN from the operator). Then SCEF/NEF sends the monitoring request to the HSS/UDM. After receiving the request, the HSS/UDM monitors the event periodically by sending request to OSS node to obtain the information of whether the phone number is unsubscribed to the user. The procedure how HSS/UDM obtain the information of whether a phone number is unsubscribed to a user is the same as the Subscription Mode which has been described above.

When the second request is status query request, a new status request/response mode is introduced to obtain the current subscription status of the MSISDN/GPSI (phone number). For example, the SCS/AS sends Subscription Status Request message to SCEF/NEF, then SCEF/NEF sends the Subscription Status Request message to HSS/UDM. Upon receiving the request, the HSS/UDM send request for once to OSS node to obtain the information of whether the phone number is unsubscribed to the user. The procedure how HSS/UDM obtain the information of whether a phone number is unsubscribed to a user is the same as the Query Mode which has been described above.

In one embodiment, the second request includes a user identifier of the user. The user identifier can be the user's ID card number or passport number or the user's name. The user identifier which identifies the user can be used by the HSS/UDM to determine whether a phone number is unsubscribed to a user. For how HSS/UDM determines whether a phone number is unsubscribed to a user has been described in the above embodiments, detailed description thereof is omitted here for brevity.

At Block 404, the application server receives a second response from the network exposure entity, wherein the second response includes the information of whether the phone number is unsubscribed to the user to a network exposure entity.

In one embodiment, the second response further includes un-subscription reason information. This is corresponding to the scenario in which the user decides not to use a phone number anymore. For which has been described in the above embodiments, detailed description thereof is omitted here for brevity.

In another embodiment, the second response further includes an operator identifier that identifies the operator which the phone number is ported in. This is corresponding to the scenario in which the user changes the operator with the same phone number. For some parts which have been described in the above embodiments, detailed description thereof is omitted here for brevity.

The second response can be in various format. When the second request is an event subscription request, the second response is a Monitoring Response message. When the second request is status query request, the second response is a Subscription Status Response message.

The present solution introduces a mechanism enabling the application server in 3rd party service providers side to be aware of the un-subscription of a phone number to an individual person. Then 3rd party service providers can take appropriate actions based on this, which will also avoid the troubles brought to the new person being allocated with the same phone number later.

Figure 5:
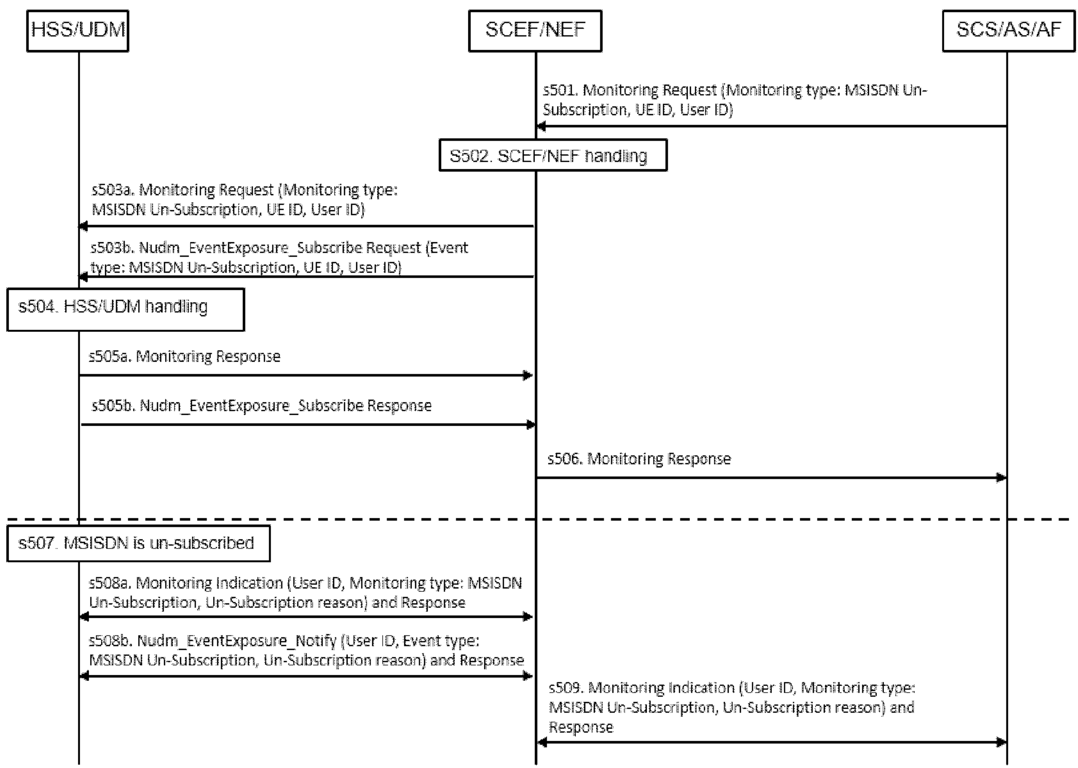
FIG. 5 shows a diagram showing a system flowchart according to an embodiment of the disclosure.

FIG. 5 is a block diagram showing a system suitable for use in practicing some embodiments of the disclosure.

This embodiment is to introduce a monitoring event for MSISDN un-subscription notification. The 3rd party service provider acting as the SCS/AS/AF can subscribe this event reporting from operator network. The event monitoring is configured in HSS/UDM via SCEF/NEF. When the MSISDN is not associated with the person (e.g., identified by ID card) anymore, e.g., when an MSISDN is unsubscribed, HSS/UDM reports the event to SCS/AS/AF via SCEF/NEF.

The step s501-s506 are for event configuration and applies to both single UE configuration and group UE configuration.

At s501, the SCS/AS/AF sends a Monitoring Request message to the SCEF/NEF with the Monitoring Type set to "MSISDN un-subscription". This event type indicates that when the MSISDN is not associated with the current person (e.g., the person unsubscribes the MSISDN from the operator), the report needs to be provided to the SCS/AS/AF. In this message, for single UE, MSISDN or external identifier is included as the UE ID while for group of UE, External Group ID is included as UE ID which can be mapped in operator network to MSISDNs. In this message, for single UE, user ID can be additionally included to identify the person, e.g., user ID includes the information of the ID card number or the user's name.

At s502, SCEF/NEF handles the request and verifies whether the SCS/AS/AF is allowed for this type of monitoring event configuration.

At s503*a*, for EPS, the SCEF sends a Monitoring Request message to the HSS with the Monitoring Type set to "MSISDN un-subscription". user ID is also included if received from SCS/AS/AF.

At s503*b*, for 5GS, the NEF sends a Nudm_EventExposure_Subscribe Request to the UDM with the Event Type set to "MSISDN un-subscription". user ID is also included if received from SCS/AS/AF.

At s504, the HSS/UDM handles the request.

At s505*a*, for EPS, the HSS sends a Monitoring Response to the SCEF.

At s505*b*, for 5GS, the UDM sends a Nudm_EventExposure_Subscribe Response to the NEF.

At s506, the SCEF/NEF sends a Monitoring Response to the SCS/AS/AF.

Below steps s507 to s509 are for event reporting.

At s507, the HSS/UDM detects that the MSISDN is un-subscribed, i.e., the MSISDN is un-subscribed or the MSISDN is changed to another operator.

At s508*a*, for EPS, the HSS sends Monitoring Indication to the SCEF with the Monitoring Type set to "MSISDN un-subscription". HSS may also include Un-subscription reason in the message to indicate the reason of the un-subscription, e.g., un-subscribed, or number out-port to another operator.

At s508*b*, for 5GS, the UDM sends a Nudm_EventExposure_Notify to the NEF with the Event Type set to "MSISDN un-subscription". UDM may also include Un-subscription reason in the message to indicate the reason of the un-subscription, e.g., un-subscribed, or number out-port to another operator.

At s509, the SCEF/NEF sends Monitoring Indication to the SCS/AS/AF with the Monitoring Type set to "MSISDN un-subscription". In this message, Un-subscription reason is included if received from HSS/UDM.

The present solution introduces a monitoring event for MSISDN un-subscription notification. This mechanism enables the application server in 3rd party service providers side to make a monitoring event subscription in HSS/UDM. When the HSS/USM finds the association between the phone number and the user has changed, it will notify the application server. This mechanism is convenient for application server side since it only sends the event subscription request.

Figure 6:
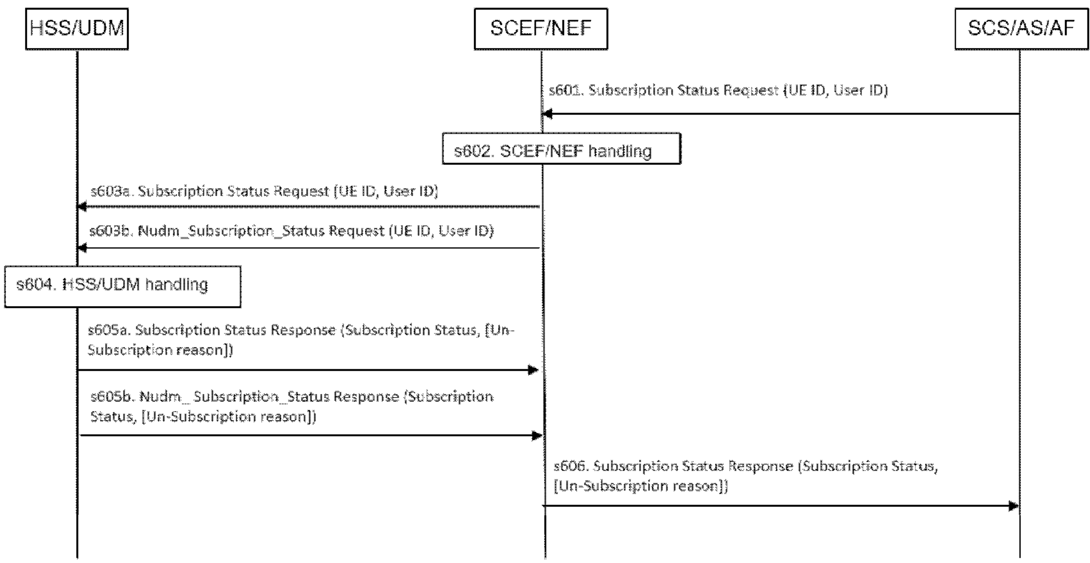
FIG. 6 shows a diagram showing a system flowchart according to another embodiment of the disclosure.

FIG. 6 is a block diagram showing a system suitable for use in practicing some embodiments of the disclosure.

This embodiment is to introduce a new one-time query for MSISDN subscription status check. The SCS/AS/AF may trigger this query at any time, e.g. when the SCS/AS/AF determines "no activity" for the UE in a long period.

At s601, the SCS/AS/AF sends a Subscription Status Request message to the SCEF/NEF. In this message, UE ID and user ID are included. The UE ID can be MSISDN or external identifier. The user ID identifies the person, e.g., includes the information of the ID card number or the user's name.

At s602, SCEF/NEF handles the request and verifies whether the SCS/AS/AF is allowed for this request.

At s603*a*, for EPS (Evolved Packet System) in 4G, the SCEF sends a Subscription Status Request message to the HSS.

At s603*b*, for 5GS (5G System), the NEF sends a Nudm_Subscription_Stauts Request to the UDM.

At s604, The HSS/UDM handles the request.

At s605*a*, for EPS, the HSS sends a Subscription Status Response to the SCEF. In this message, Subscription Status (value may be "subscribed" or "unsubscribed") is included to indicate whether the MSISDN is subscribed to the user ID. If it is un-subscribed, Un-Subscription reason may be additionally included to indicate the reason, e.g., un-subscribed, or number out-port to another operator.

At s605*b*, for 5GS, the UDM sends a Nudm_Subscription_Stauts Response to the NEF. In this message, Subscription Status (value may be "subscribed" or "unsubscribed") is included to indicate whether the MSISDN is subscribed to the user ID. If it is un-subscribed, Un-Subscription reason may be additionally included to indicate the reason, e.g., un-subscribed, or number out-port to another operator.

In some implementations, step 605 may be a rejection/negative response which implies "UE not found" since the whole UE subscription is removed in the UDM/HSS. This is also an indication for the SCEF/NEF to treat the queried UE as "unsubscribed".

At s606, the SCEF/NEF sends a Subscription Status Response to the SCS/AS/AF.

The present solution introduces one-time query for MSISDN subscription status check. When the application server wants to get the status of the phone number, it sends a one-time query, the application server can get the status at any time.

Figure 7:
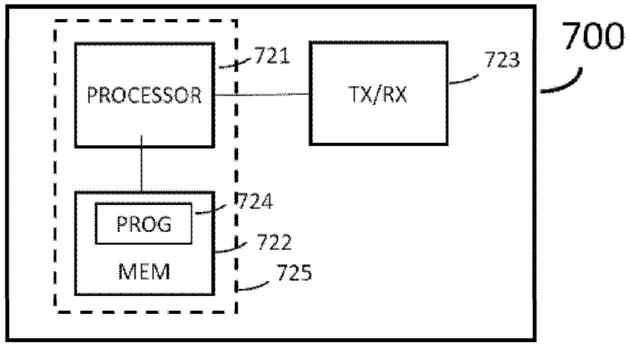
FIG. 7 is a block diagram showing an apparatus suitable for use in practicing some embodiments of the disclosure.

FIG. 7 is a block diagram showing an apparatus suitable for use in practicing some embodiments of the disclosure. For example, any one of the data management entity or the application server as described above may be implemented through the apparatus 700.

The apparatus 700 comprises at least one processor 721, such as a DP, and at least one MEM 722 coupled to the processor 721. The apparatus 720 may further comprise a transmitter TX and receiver RX 723 coupled to the processor 721. The MEM 722 stores a PROG 724. The PROG 724 may include instructions that, when executed on the associated processor 721, enable the apparatus 720 to operate in accordance with the embodiments of the present disclosure. A combination of the at least one processor 721 and the at least one MEM 722 may form processing means 727 adapted to implement various embodiments of the present disclosure.

Various embodiments of the present disclosure may be implemented by computer program executable by one or more of the processors 721, software, firmware, hardware or in a combination thereof.

The MEM 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 721 may be of any type suitable to the local technical environment, and may include one or more of general purpose computers, special purpose computers, microprocessors, digital signal processors DSPs and processors based on multicore processor architecture, as non-limiting examples.

Figure 8:
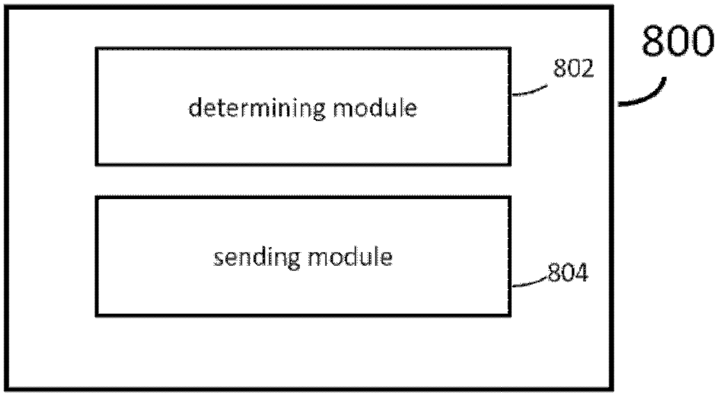
FIG. 8 is a block diagram showing a data management entity according to an embodiment of the disclosure.

FIG. 8 is a block diagram showing a data management entity according to an embodiment of the disclosure. As shown, the data management entity comprises a determining module (802) and a sending module (804). The determining module (802) may be configured to determine whether a phone number is unsubscribed to a user. The sending module (804) may be configured to send a first message to a network exposure entity, wherein the first message includes an indication which indicates whether the phone number is unsubscribed to the user.

Figure 9:
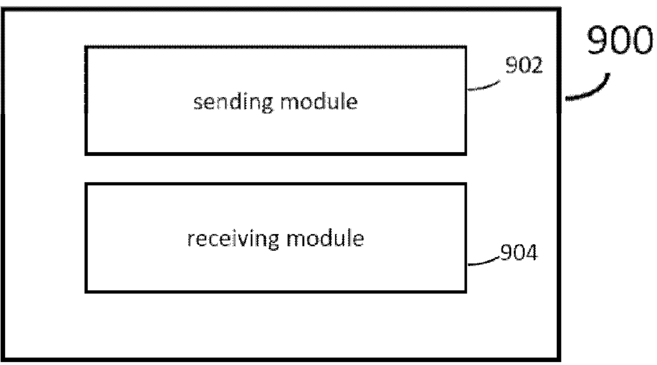
FIG. 9 is a block diagram showing an application server according to an embodiment of the disclosure.

FIG. 9 is a block diagram showing an application server according to an embodiment of the disclosure. As shown, the application server comprises a sending module (902) and a receiving module (904). The sending module (902) may be configured to send a second request for information of whether a phone number is unsubscribed to a user to a network exposure entity. The receiving module (904) may be configured to receive a second response from the network exposure entity, wherein the second response includes the information of whether the phone number is unsubscribed to the user to a network exposure entity.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a data management entity, comprising:

determining whether a phone number is unsubscribed to a user; and sending a first message to a network exposure entity, wherein the first message includes an indication which indicates whether the phone number is unsubscribed to the user.

2. The method according to claim 1, wherein the determining whether the phone number is unsubscribed to the user comprises:

obtaining information of whether the phone number is unsubscribed to the user from an Operation Supporting System, OSS, entity.

3. The method according to claim 1, wherein the first message further includes un-subscription reason information.

4. The method according to claim 1, wherein the first message further includes an operator identifier that identifies the operator which the phone number is ported in.

5. The method according to claim 1, the methods further comprises:

receiving a first request for information of whether the phone number is unsubscribed to the user from the network exposure entity.

6. The method according to claim 5, wherein the first request includes a user identifier of the user.

7. The method according to claim 5, wherein the first request is a Monitoring Request message or a Nudm_EventExposure_Subscribe Request message or a Subscription Status Request message; and wherein the first message is a Monitoring Response message or a Nudm_EventExposure_Subscribe Response message or a Subscription Status Response message.

8. The method according to claim 1, wherein the phone number is identified by Mobile Subscriber ISDN Number, MSISDN, or Generic Public Subscription Identifier, GPSI.

9. The method according to claim 1, wherein the data management entity is a Home Subscriber Server, HSS or a Unified Data Management, UDM; and wherein the network exposure entity is a Service Capability Exposure Function, SCEF, or a Network Exposure Function, NEF.

10. A method at an application server, comprising:

sending a second request for information of whether a phone number is unsubscribed to a user to a network exposure entity; and receiving a second response from the network exposure entity, wherein the second response includes the information of whether the phone number is unsubscribed to the user to a network exposure entity.

11. The method according to claim 10, wherein the second request includes a user identifier of the user.

12. The method according to claim 10, wherein the second response further includes un-subscription reason information.

13. The method according to claim 10, wherein the second response further includes an operator identifier that identifies the operator which the phone number is ported in.

14. The method according to claim 10, wherein the second request is a Monitoring Request message or a Subscription Status Request message;

wherein the second response is a Monitoring Response message or a Subscription Status Response message.

15. The method according to claim 10, wherein the phone number is identified by Mobile Subscriber ISDN Number, MSISDN, or Generic Public Subscription Identifier, GPSI.

16. The method according to claim 10, wherein the application server is one of: a service capability server, SCS; an application server, AS; and an application function, AF; and wherein the network exposure entity is a Service Capability Exposure Function, SCEF, or a Network Exposure Function, NEF.

17. A data management entity comprising:

at least one processor; and at least one memory, the at least one memory containing instructions executable by the at least one processor, whereby the data management entity is operative to:

determine whether a phone number is unsubscribed to a user; and send a first message to a network exposure entity, wherein the first message includes an indication which indicates whether the phone number is unsubscribed to the user.

18. The data management entity according to claim 17, wherein to determine whether the phone number is unsubscribed to the user comprises:

obtaining information of whether the phone number is unsubscribed to the user from an Operation Supporting System, OSS, entity.

* * * * *